Patented Aug. 8, 1950

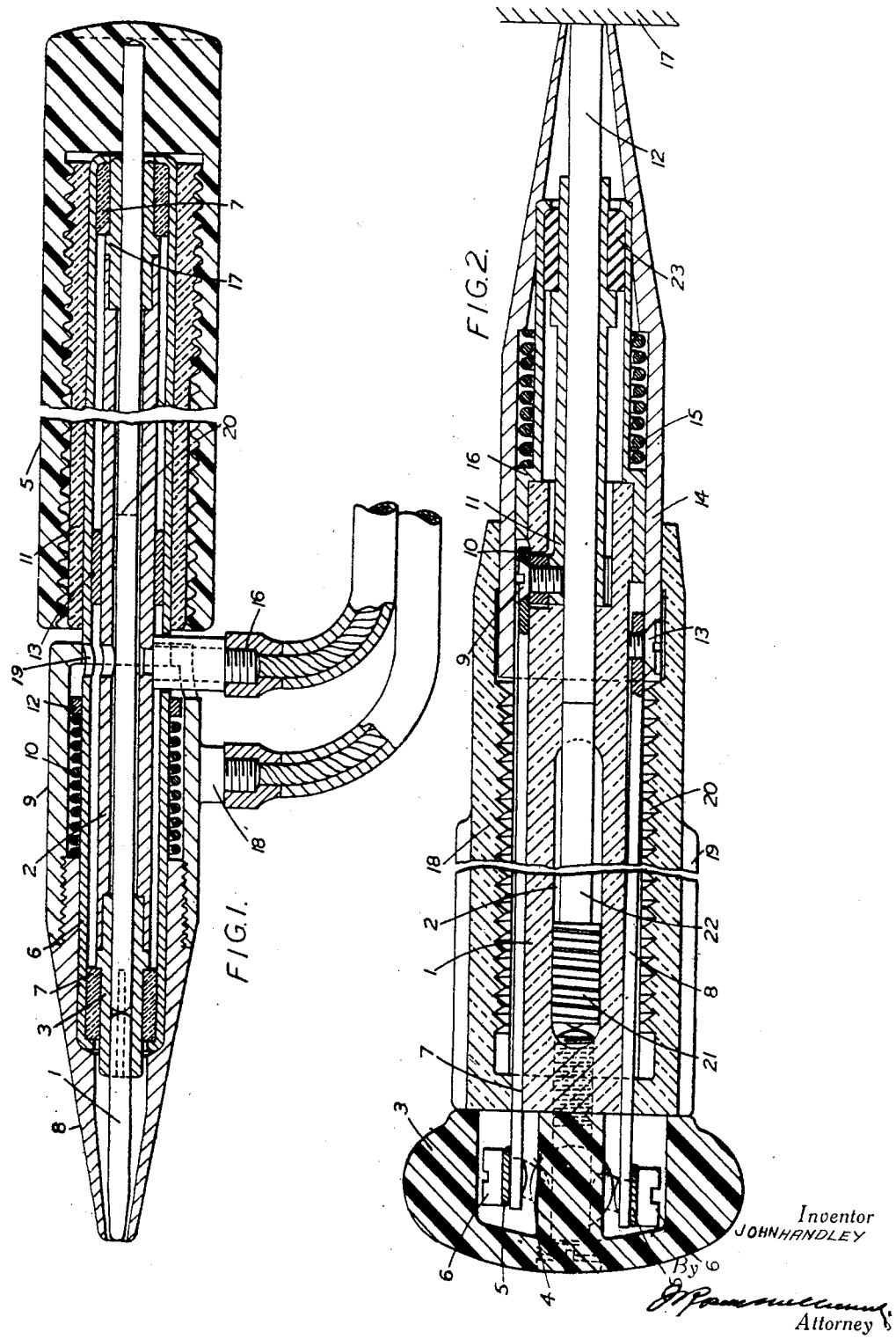

2,517,561

UNITED STATES PATENT OFFICE 2,517,561

SOLDERING IRON

John Handley, Middlesex, England, assignor, by mesne assignments, to International Standard Electric Corporation, New York, N. Y., a corporation of Delaware Application November 28, 1944, Serial No. 565,466
In Great Britain November 16, 1943

Section 1, Public Law 690, August 8, 1946
Patent expires November 16, 1963

6 Claims. (Cl. 219—26)

This invention relates to electric soldering tools, and more particularly to low-voltage, hand tools.

An object of the invention is to provide an electric soldering tool of a design suitable for use in positions that are difficult of access, especially where the position is one having neighbouring parts that might be damaged by inadvertent contact with a hot iron; such may be the case for example when it is a matter of soldering wires to terminals in the interior of a radio set that has been designed to show the utmost economy in space because it is to be installed in an aircraft.

According to one feature of the invention an electric soldering hand tool comprises a nozzle like electrode, a rod like electrode located in said nozzle like electrode and spring means urging said rod like electrode rearwardly relative to the nozzle like electrode, electrical connection between the electrodes being established by contact of both electrodes with the work-piece when the tool is pressed against the work-piece.

According to another feature of the invention an electric soldering tool comprises a carbon rod through which current flows to the work-piece when the tool is pressed against the work-piece, a nozzle surrounding and protecting the rod and spring urged forwardly so as completely to cover the rod when normal and means for feeding the rod forwardly to take up wear.

According to yet another feature of the invention an electric soldering hand-tool comprises a tubular core, a shank like handle fitting on the rear end of the core and having screw threaded engagement therewith, a carbon rod projecting from the forward end of said core, a nozzle fitting over the forward end of the core and spring urged forwardly so as completely to cover the carbon rod when normal, a thrust rod fixed in said handle and extending forward axially of the core to enable the carbon rod to be pushed forwardly upon rotation of the handle and an electrical connection to the carbon rod.

The invention will be better understood from the following description taken in conjunction with the accompanying drawings in which Figures 1 and 2 each show, in axial section, an embodiment of the invention.

A still further feature of the invention consists in an electric soldering hand tool in which a carbon rod is fed through a stationary core as the carbon wears, characterised in that means for feeding the carbon forward comprises a sleeve fitting over the said core and having screw-threaded engagement with a non-rotatable pusher rod.

The soldering tool shown in Figure 1 is built up on a unitary core consisting of an inner metal tube 2, an outer metal tube 6 and an insulating outer sleeve 11. The two metal tubes 2 and 6 are held in rigid assembly by means of one or more insulating bushes 13 spacing them apart and by porcelain insulators 7 at the front and rear of the core, so that although they are mechanically one, they are electrically insulated from one another.

At the front and rear ends of the core are split ferrules 3 and 17 that grip fairly tightly upon rods 1 and 4 passing centrally through the inner tube 2. Of these two rods, the forward rod 1 is the carbon element engaged with the work-piece to be heated, while the rearward rod 4 is the thrust rod by means of which the carbon element 1 can be pushed forward a bit as it wears.

At its rearmost extremity the thrust rod 4 is forced tightly into a cylindrical handle 5 of insulating material that extends forwardly over the core and is in screw-threaded engagement with the insulating sleeve 11 which has a screw cut in the out-side periphery of its rear end. Thus rotation of the handle 5 will cause axial movement of the thrust rod 4 and hence of the carbon element 1.

Fitting over the forward end of the unitary core is a nozzle, consisting of a conical sheath 8 and a cylindrical cover 9, which is slidable axially relative to the core. A helical compression spring 10 housed between the cover 9 and the outer tube 6 urges the nozzle forwardly, this forward movement being limited by the engagement of an inward flange on the rear end of the cover 9 with a collar 12 fixed on the tube 6.

Electrical connections are provided, on the one hand to the carbon element 1, via the inner tube 2; and on the other hand to the nozzle 3, 9 direct. These connections are provided as shown at 16 and 18 respectively. (The hole 19 is merely to enable terminal 16 to be riveted into position.)

The soldering tool shown in Figure 2 is the preferred embodiment of the invention and consists of a non-rotary assembly including a carbonholder, a rotary sleeve fitted on this assembly and serving to feed the carbon axially as it wears, and a nozzle fitting over the carbon and displaceable rearwardly against spring-pressure.

The non-rotary assembly comprises a central core 1 which is of circular section and which has a slot 2 of rectangular section extending diametrally of the core for a considerable axial length. Fixed to the core 1 at the rearward end is a knob 3 of moulded insulating material such as Bakelite (registered trade-mark). An aperture 4 in this knob permits entry for the electric supply leads of which the bared ends 5 are shown wrapped round terminal screws 6. These terminal screws 6 are carried on the rearward ends of two metal strips 7 and 8 which extend forwardly in the axis direction along grooves cut in the periphery of the core 1. Strip 7 at its forward end is secured by means of a screw 9 and filter 10 to a sleeve 11 which constitutes a carbon holder, the carbon itself, in the form of a rod 12, having a moderate frictional engagement with the bore of the holder 11 and being brought by this means too into electrical connection with the supply lead associated with conductor. The conductor strip 7 and the carbon holder 11 are immovable. The lower conductor strip 8, on the other hand, is in rigid mechanical and good electrical connection by means of a screw 13 with a nozzle 14 that surrounds the carbon element 12 and normally projects forwardly a little beyond the carbon, being so urged by a helical compression spring 15 that encircles a tubular member 16 which constitutes a forward extension of the core 1. A porcelain bush 23 locates the tubular member 16 relatively to the carbon holder 11. In the drawing the soldering tool is shown pressed into operative engagement with a work-piece 17, so that the nozzle 14 and conductor strip 8 are in their most rearward positions and the spring 15 most compressed.

Fitting over the non-rotary assembly is a rotary sleeve 18 of heat and electrical-insulating material, preferably moulded. This sleeve 18 has external flutes 19. Internally it is screw-threaded as at 20. This continuous screw-thread engages corresponding threads on an element 21 which is slidable without rotation within the slot 2 in core 1 and which is solid with a pusher rod 22 lying immediately behind the carbon rod 12. Thus by rotation of the sleeve 18 the carbon rod 12 can be fed forwardly.

The tool as described and shown in either of the figures is particularly well suited for jobs that are difficult of access to an ordinary soldering iron, as for example is often the case in soldering wires to terminals of radio equipment. When the tool head is pushed on to the workpiece, the nozzle slides backwardly on the core, thus allowing the carbon to make contact with the work-piece, as well as the nozzle. The heating current then flows between the nozzle and the carbon, via the work-piece.

A feature of the embodiment shown in Figure 2 is that the electric leads to the tool are taken to the extreme rearward end thereof, so that the slender contour which contributes to its utility in reaching positions difficult of access is preserved throughout its length; a further feature is the simplicity of the carbon-feeding mechanism which is robust and enables the manipulation to be effected with one hand.

What is claimed is:

1. An electric soldering hand tool comprising a supporting sleeve, an outer nozzle-like electrode slidably bearing thereon, an inner rod-like electrode slidably within the supporting sleeve and in insulated and spaced relation to the outer electrode, a compression spring arranged normally to effect relative axial movement of the electrodes to position the rod electrode inwardly of the nozzle electrode, a threaded adjusting member rotatably supported on the supporting member and a follower member having threaded engagement therewith and arranged to effect axial adjustment of the rod electrode.

2. An electric soldering hand tool adapted to effect circuit closing by engagement of its electrodes with a work piece when the tool is pressed thereagainst comprising a supporting member, an outer nozzle-like electrode fitted to slidably bear thereon and having a nozzle portion extending forward of the supporting member, an inner rod-like electrode adjustable within the supporting member and movable axially thereof and being in spaced relation to the outer electrode and insulated therefrom, a compression spring supported to bear against the outer electrode normally to move said electrode to a position protectively enclosing the inner electrode and an adjusting member operative to effect an adjusting axial movement of the inner electrode and circuit connections to the respective electrodes.

3. An electric soldering hand tool comprising a supporting sleeve provided with a split ferrule forward end portion, an outer nozzle-like electrode slidably on the sleeve, an inner rod-like electrode fitted within the supporting sleeve ferrule portion in spaced and insulated relation to the outer electrode and spring means positioned to be operable to effect relative axial movement of the electrodes normally to position the inner electrode inwardly of the nozzle electrode and circuit connections to the respective electrodes.

4. An electric soldering hand tool comprising a supporting sleeve, an outer nozzle-like electrode slidably bearing thereon, said sleeve having a split ferrule forward end portion, an inner rod-like electrode fitted within the sleeve in spaced relation to the outer electrode, a follower rod fitted within the sleeve rearward of the inner electrode and axially movable for adjustment of the inner electrode, a rotatable and insulated handle and adjusting member threaded upon the supporting sleeve and connected to impart adjusting movement to the follower rod and spring means positioned to act upon the outer electrode to effect movement thereof normally to position the inner electrode inwardly of the outer electrode.

5. An electric soldering hand tool comprising a supporting sleeve composed of two co-axial tubes mechanically connected but electrically insulated from one another, an outer nozzle-like electrode slidably bearing thereon, said sleeve having a split ferrule forward end portion, an inner rod-like electrode fitted within the sleeve in spaced relation to the outer electrode, a follower rod fitted within the sleeve rearwardly of the inner electrode and axially movable for adjustment of the inner electrode, a rotatable and insulated handle and adjusting member threaded upon the supporting sleeve and connected to impart adjusting movement to the follower rod and spring means positioned to act upon the outer electrode to effect movement thereof normally to position the inner electrode inwardly of the outer electrode.

6. An electric soldering hand tool comprising a supporting sleeve member formed with a split ferrule forward end portion, an outer cylindrical electrode slidably bearing thereon, an inner electrode fitted within the supporting sleeve member in spaced relation to and insulated from the outer electrode, spring means operatively positioned to effect relative axial movement of the outer electrode normally to position the inner electrode inwardly of the outer electrode, a follower rod slidably fitted within the sleeve member in engagement with the rearward end of the inner electrode, an insulating handle, an adjusting member rotatably supported upon the rearward end of the sleeve member and having threaded engagement with the follower rod to effect axial movement thereof, circuit connections through the handle member and conductor bars positioned therein and provided with forward extensions electrically connected to the respective electrodes and the conductor bar connected to the outer electrode being supported to permit axial movement.

JOHN HANDLEY.

REFERENCES CITED

The following references are of record in the file of this patent:

UNITED STATES PATENTS

| Number | Name | Date |
|---|---|---|
| 1,690,101 | Burns | Nov. 6, 1928 |
| 1,862,653 | Bean | June 14, 1932 |
| 2,045,523 | Fassler | June 23, 1936 |
| 2,080,220 | Butter et al. | May 11, 1937 |

FOREIGN PATENTS

| Number | Country | Date |
|---|---|---|
| 199,840 | Switzerland | Nov. 16, 1938 |